United States Patent

[11] 3,607,785

| [72] | Inventors | Maseh Osgan<br>Paris;<br>Robert Charpentier, Epinay, Seine;<br>Philippe Teyssie, Vesinet, all of France |
|---|---|---|
| [21] | Appl. No. | 777,893 |
| [22] | Filed | Nov. 21, 1968 |
| [45] | Patented | Sept. 21, 1971 |
| [73] | Assignee | Institut Francais du Petrole des Carburants et Lubrifiants<br>Rueil Malmaison, (Hauts de Seine), France |
| [32] | Priority | Nov. 21, 1967 |
| [33] |  | France |
| [31] |  | 129,123 |

[54] POLYMERIZATION CATALYSTS, THEIR MANUFACTURE AND USE FOR POLYMERIZING CYCLIC ETHERS
9 Claims, No Drawings

[52] U.S. Cl. .................................................. 252/431 C, 260/2 A

[51] Int. Cl. ........................................................ C08g 23/14
[50] Field of Search ............................................ 252/431

[56] References Cited
UNITED STATES PATENTS

| 3,313,846 | 4/1967 | Slovinsky ..................... | 252/431 X |
| 3,427,260 | 2/1969 | Maguet-Martin et al. ..... | 252/431 X |

*Primary Examiner*—Patrick P. Garvin
*Attorney*—Craig, Antonelli and Hill

ABSTRACT: A process for manufacturing an improved catalyst comprising reacting an aluminum compound with a zinc compound and contacting the resultant catalyst with a primary alcohol of the general formula R'-CH$_x$-OH, wherein R' is a hydrocarbon monovalent radical containing from 1 to 20 carbon atoms.

POLYMERIZATION CATALYSTS, THEIR MANUFACTURE AND USE FOR POLYMERIZING CYCLIC ETHERS

The present invention relates to improvements in the manufacture and use of the polymerization catalysts previously described in Belgian Pat. No. 680,456 in the name of the applicant and U.S. Pat. No. 3,432,445. These catalysts are obtained by reacting a trivalent metal compound of the formula:

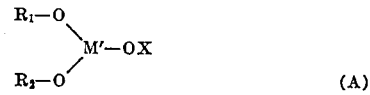

(A)

with a divalent metal compound of the formula:

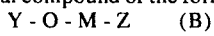    (B)

wherein M' is a trivalent metal, M a divalent metal, Z represents the radical $OR_3$ or an acyloxy radical, one of the radicals X and Y being a radical $R_4$ and the other an acyl radical, the radicals $R_1$ to $R_4$ being hydrocarbon monovalent radicals, a byproduct of formula XOY being separated during the reaction.

There are generally used from 0.01 to 100 (preferably from 0.1 to 10) moles of compound A per mole of compound B. Further details are given in the specification of the Belgian Pat. No. 680,456, published Dutch application No. 66/6,207 or U.S. Pat. No. 3,432,445.

The new feature, object of the present invention, consists of treating the catalyst with a primary alcohol containing at least two carbon atoms per molecule, which treatment results in an unexpected improvement in the activity of the catalyst, far higher than that achieved in the case of a treatment with a secondary or tertiary alcohol, said improvement being observed in the form of a higher reaction velocity and/or of an increase in the proportion of the stereoregular portion of the obtained polymer. It has thus been observed that whereas, in some cases, in the presence of the previous catalyst as defined in the Belgian Pat. No. 680,456 or U.S. Pat. No. 3,432,445, the obtained polymers were of low molecular weight and with a greasy consistence the use of the new catalyst according to this invention resulted in the obtainment of polymers of high molecular weight with a rubbery consistence.

It is noticeable that the action of the primary alcohol does not result in the mere exchange of a radical in the catalytic complex since in case of operation with an excess of primary alcohol it is observed that the amount of recovered alcohol (corresponding to the alcoholate which has been used for the synthesis of the catalyst) is less than that of the consumed primary alcohol.

Furthermore, if the significant improvement due to the treatment with a primary alcohol, were the result of a mere exchange of radical, an identical improvement should be obtained by introducing this radical in the early stage of the synthesis of the basic catalyst, by use of the trivalent metal in the form of the alcoholate of the primary alcohol.

In fact the experience has shown that the treatment with a primary alcohol of such a catalyst, obtained from an alcoholate of primary alcohol, provided for an astonishing improvement in the properties of said catalyst, which proves that these particular properties were not attributable to the only presence of this radical of primary alcohol.

The preparation of the new catalyst, which consists of contacting the above-defined catalyst with a primary alcohol introduced either in a liquid or vapor state, may be carried out either with or without solvent. Preferably the operation is conducted in a substantially anhydrous medium.

The primary alcohol preferably complies with the general formula $R'CH_2OH$ wherein R' represents a hydrocarbon monovalent radical, preferably containing from one to 20 carbon atoms, such as, for example an alkyl, alkenyl, cycloalkyl, cycloalkenyl, aryl, arylalkyl, arylalkenyl, alkaryl or alkenylaryl radical. The more currently used alcohols are those having an alkyl radical such as, for instance n-propyl, n-butyl alcohols and 3-methyl-1-butanol.

As other examples are to be mentioned the following alcohols: 1-dodecanol, 1-hexa-decanol, 2 propene-1o1, as well as benzyl alcohol and 2-phenyl-1-ethanol.

The amount of primary alcohol introduced must be in the proportion of at least 0.01 mole of alcohol per gram-atom of trivalent metal and preferably between 0.05 and 25 moles of alcohol per gram-atom of trivalent metal of the catalyst, these limits being however not limitative. It is also possible to use a large excess of alcohol which will then act as solvent.

The mixture is brought to a temperature which may, for instance, be comprised between −30° C. and 250° C. and preferably between −10° C. and 180° C., and the time of contact may vary within very wide limits of from a few seconds (for instance 5 seconds) up to several days, according to the desired catalytic properties. It is preferable in certain cases to evaporate the volatile products during and/or after the reaction.

According to a particular embodiment of the invention the basic catalyst is subjected, prior to the introduction of the primary alcohol, to a thermal treatment over a duration of from a few seconds to a few days, the temperature of this treatment being, for example, comprised between 150° C. and 300° C.

An improved feature of the present invention consists of having the above-mentioned treatment of the catalyst with a primary alcohol followed with a complementary treatment by a tertiary alcohol or by methanol, under general conditions similar to those described with respect to the treatment with the primary alcohol.

The catalyst obtained as a result of this complementary treatment exhibits the advantage of keeping a high degree of activity at the low concentrations at which the normal catalyst loses a part of its activity.

Moreover, due to this complementary treatment, there are obtained polymers whose insoluble portion in acetone at −20° C. is substantially higher.

As examples of preferred tertiary alcohols are to be mentioned tert.butanol, tert.pentanol, tert.octanol as well as other saturated aliphatic tertiary alcohols.

The following examples are given for illustrative purposes and are not intended to limit in any way the scope of the invention. Comparative examples 1 bis, 4A, 4B, 4C and 11B are not however within the scope of the invention. In all of these examples temperatures are in degrees centigrades.

EXAMPLE 1

Into a reactor previously purged with dry argon, and provided with a reflux condenser, an outlet and a stirrer, there is placed under argon atmosphere a solution containing 0.3 gram-atom of catalyst as manufactured according to the process described in Belgian Pat. No. 680,456 or U.S. Pat. No. 3,432,445 in 150 cc. of chlorobenzene.

The above-mentioned catalyst has been obtained from aluminum tri-n-butoxide and zinc acetate. The amount of catalyst is expressed in term of the total of the trivalent metal and the divalent metal (atomic ratio Al/Zn=2) contained therein, given in gram-atoms.

To this solution are added 120 g. of dry n-butyl alcohol and the mixture is treated to reflux for 8 hours. The mixture is then allowed to cool down to the ambient temperature and the excess of alcohol and chlorobenzene are distilled off under reduced pressure so as to eliminate volatile substances. Distillation begins at the ambient temperature under a pressure of about 1 torr and terminates with a temperature of about 50° C. (bath temperature) and a pressure of about 0.05 torr. Thereafter the resinous residue is dissolved in about 20 cc. of chlorobenzene and distilled again in the manner hereabove set forth.

This operation is repeated three or four times, so as to completely remove, by carrying away, the free alcohol traces remaining in the residues.

The residue is thereafter dissolved in dry heptane and there is so obtained a limpid yellow solution, exhibiting a green fluorescence, which is kept under argon atmosphere. The results of the polymerization tests with the use of the obtained catalytic solution, as well as with any of the solutions whose preparation is described in example 2 to 4C, are given in table I hereafter.

EXAMPLE 1 bis

A catalyst is prepared according to the process of example 1 except that it is not subjected to the treatment with a primary alcohol. Results are shown in table I.

EXAMPLE 2 A

The apparatus used is the same as in example 1 except for the following changes: the reflux condenser is replaced by a rectifying column of the Vigreux-type, comprising a distillation head permitting either to effect a partial or complete distillation, or to maintain the reaction under condition of total reflux. In the above-described apparatus there are introduced 200 cc. of a solution of catalyst in decahydronaphthalene, reaction solvent which is not subjected to distillation after termination of the catalyst preparation (in accordance with the method described in Belgian Pat. No. 680,456 or U.S. Pat. No. 3,432,445). This solution, prepared from aluminum triisopropoxide and anhydrous zinc acetate, contains 0.132 gram-atom of catalyst (Al+Zn), and 150 cc. of n-butyl alcohol are added thereto.

The mixture is heated to total reflux and it is observed that the temperature at the top of the column (83°) is the distillation temperature of isopropyl alcohol.

All of the isopropyl alcohol is thus recovered by distillation with partial reflux (about 1 cc./minute). The distillation is then continued and the temperature rises to 118°–119° C.; there is further recovered from 5 to 10 cc. of liquid having distilled off at said temperature. The operation is thereafter identical to that described in example 1. The heptane solution of the resulting catalyst is referenced 2A.

EXAMPLE 2B

Example 2A is repeated with the exception of the following change: The operation is conducted from the beginning under reduced pressure (about 1 to 2 torrs), whereas the mixture (catalyst + n-butyl alcohol) is heated to 45° C. during the whole time of operation which otherwise is continued in the same manner as in example 1.

EXAMPLE 2C

Example 2A is repeated except that, after distillation of the displaced isopropyl alcohol the distillation is stopped. The whole mixture is heated to reflux for 8 hours under atmospheric pressure. The operation is thereafter continued similarly as according to example 1.

EXAMPLES 3A, 3B and 3C

Aluminum triisopropoxide is condensed with zinc acetate according to the operating manner described in example 1 of Belgian Pat. No. 680,456 with the exception of the following changes: the condensation is carried out in tetrahydronaphthalene instead of decahydronaphthalene. After removal of the isopropyl acetate formed by distillation, treating of the condensate is continued for 5 hours at 200°–**° C.

After cooling there is observed the formation of a precipitate in substantial amount. To this mixture are added 400 g. of n-butyl alcohol per gram-atom of aluminum. After stirring for a short time it is observed that the insoluble portion becomes dissolved in the form of a homogeneous yellow solution.

The same operations as in examples 2A, 2B and 2C are then carried out with the above solution.

EXAMPLES 4A and 4C

For comparison purposes the workable conditions of examples 2A and 3C are repeated except that isopropyl alcohol is substituted for n-butyl alcohol.

It is observed that the dissolution is not complete with isopropyl alcohol as it is in example 3C with butyl alcohol, and that, after heating at reflux for 8 hours, it still remains an insoluble portion. After decantation of the insoluble portion, the soluble portion is transferred into a receiver purged with argon. The complexometric analysis shows that the atomic ratio Al/Zn, which is equal to 2 at the starting time, is brought to 3; this solution is given reference 4C.

The analysis of the insoluble portion shows that is consists essentially of zinc isopropylate.

On the contrary there is obtained a substantially homogeneous and limpid solution when using the operating conditions of example 2A, the atomic ratio Al/Zn being maintained at the starting value i.e. equal to 2. This solution is given reference 4A.

EXAMPLE 4B

Example 4C is repeated but with the use, as alcohol, of secondary butyl alcohol. There is thus obtained a homogenous, limpid solution to which is given reference 4B.

POLYMERIZATION TESTS

The operating conditions have been the following:
  monomer: propylene oxide in an amount of 58 parts by weight.
  solvent: n-heptane, 640 parts by weight
  catalyst: 0.025 gram-atom of metal (Al+Zn) (for 58 g. of propylene oxide)

Polymerization is continued for 1 hour at 50° C. and is stopped by addition of 0.5 part by weight of aniline. The polymer is separated by evaporation of the solution in a stream of air at ambient temperature.

The results of the operations carried out with each of the catalysts of examples 1 to 4C are given in the following table:

TABLE I

| Catalyst from example No. | Conversion rate to the polymer in % | viscosity ($\eta$) of the polymer in dl./g. | % insoluble in acetone at −20° C. |
|---|---|---|---|
| 1 | 62 | 5.7 | 48 |
| 1 bis | 4 | 3.0 | 20 |
| 2 A | 68 | 6.0 | 45 |
| 2 B | 77 | 7.2 | 57 |
| 2 C | 65 | 10.6 | 50 |
| 3 A | 68 | 6.5 | |
| 3 B | 72 | 5.7 | |
| 3 C | 61 | 9.2 | |
| 4 A | 6 | 2.3 | |
| 4 B | 21 | 5.5 | |
| 4 C | 25 | 6.2 | 25 |

EXAMPLES 5 to 8

In these examples there are used the same operating conditions as in example 3C but the primary alcohol is changed.

There are used 5 gram-molecules of the selected primary alcohol per each gram-atom of aluminum.

At the end of each operation there is obtained a resinous product which is completely soluble in anhydrous heptane, except in the case of example 8. In said last-mentioned example wherein the selected primary alcohol is benzyl alcohol, the final product exhibits a very low solubility in heptane and it is dissolved in anhydrous toluene in which it is very soluble.

The results as well as the corresponding polymerization tests are given in table II below.

TABLE II

| Example No. | Alcohol used | Solvent | test of polymerization of epoxypropane % conversion in polymer |
|---|---|---|---|
| 5 | n-propyl-alcohol | toluene | 56 |
| 6 | isobutyl alcohol | chlorobenzene | 37 |
| 7 | n-octyl alcohol | THN-toluene (2:1) | 64 |
| 8 | β-phenyl ethyl alc. | α-chloronaphthalene chlorobenzene (2:1) | 10' |

THN = tetrahydronaphthalene + polymerization solvent : toluene (815 parts by weight)

The polymerization conditions, except for example 8 wherein the solvent is toluene, are those of examples 1 to 4C.

EXAMPLE 9

9.1 g. of allylglycidyl ether, 52 g. of n-heptane and 0.008 g.-atom (Al+Zn) of the catalyst of example 3, are heated under stirring at 50° C. for 16 hours. The polymerization is stopped by addition of 0.1 g. of aniline and 0.05 g. of N-phenyl-β-naphthyl-amine.

The solvent is evaporated by means of an air stream and finally the resulting polymer is dried at 70° C. in a vacuum drying oven, under a pressure of 0.5 torr for 18 hours.

There are obtained 8.3 g. of a rubbery polymer, which corresponds to a conversion rate of 91 percent. The intrinsic viscosity, determined in toluene at 30° C. attains 2.3 dl./g.

EXAMPLE 10

12 g. of phenylglycidylether, 51 g. of heptane and 0.008 gram-atom (Al+Zn) of the catalyst of example 3C, are heated under stirring, at 50° C. for 85 minutes. The polymerization is stopped by addition of 0.2 g. of aniline. The resulting insoluble polymer is filtered, washed with toluene and then dried at 60° C. under a reduced pressure of 0.5 torr, for 18 hours. The differential thermal analysis shows a melting point of 202.7° C.

EXAMPLE 11 A

There are heated 0.10 gram-atom of the catalyst obtained according to example 2A (this catalyst has been treated with n-butyl alcohol) with 200 g. of tertiary amyl alcohol admixed with 300 cc. of chlorobenzene, for 7 hours at 100° C. (bath temperature) under the autogenous pressure (about 1.5 bars). The operating conditions are thereafter the same as in example 1.

EXAMPLE 11 B

By way of comparison the preceding example is repeated with the exception of the treatment with n-butyl alcohol.

EXAMPLE 12

A catalyst is prepared according to example 11A except that tertiary amyl alcohol is used in proportion of only 8.8 g. per 0.15 gram-atom of catalyst.

EXAMPLE 13

A catalyst is prepared according to example 12 except that tertiary butyl alcohol is used in lieu of tertiary amyl alcohol.

EXAMPLE 14

Polymerization tests are carried out with the catalysts obtained according to examples 2A and 11A to 13. The polymerization conditions are identical to those described after example 4B, except for the catalyst concentration chosen equal to 0.010 gram-atom of metal (Al+Zn) per 58 g. of propylene oxide, and for the duration of the polymerization.

The results are given in table III below:

TABLE III

| Catalyst according to example No. | Duration of the polymerization | % conversion to polymer | % insoluble in acetone at −20° C. |
|---|---|---|---|
| 2 A | 15 | 70 | 62 |
| 11 A | 1.5 | 72 | 70 |
| 11 B | 24 | 60 | — |
| 12 | 1.5 | 75 | 88 |
| 13 | 1.5 | 80 | 90 |

What is claimed as this invention is:

1. An improved process for manufacturing catalysts comprising reacting a trivalent metal compound of the formula

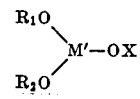

with a compound of divalent metal Y-O-M-Z, wherein M' is aluminum, M is zinc, Z is a hydrocarbon acyloxy radical, X is $R_4$, Y is a hydrocarbon acyl radical, $R_1$ to $R_4$ radicals being hydrocarbon monovalent radicals, said improved process comprising the additional step of further contacting the resulting catalyst with a primary alcohol of the general formula $R'CH_2OH$, wherein $R'$ is a hydrocarbon monovalent radical containing from one to 20 carbon atoms, at a temperature of between −30° and 250° C., said alcohol being present in an amount of at least 0.01 mole per gram-atom of trivalent metal in the catalyst.

2. A process according to claim 1 characterized in that the alcohol is an alkanol.

3. A process according to claim 1 wherein there are used from 0.05 to 25 moles of primary alcohol per gram-atom of trivalent metal in the catalyst.

4. A process according to claim 1 wherein the resulting catalyst is thereafter treated with methanol or with a saturated aliphatic hydrocarbon tertiary alcohol.

5. The process of claim 1, wherein the primary alcohol is introduced in a liquid or vapor state.

6. The process of claim 1, wherein R' is selected from the group consisting of an alkyl, an alkenyl, an aryl, and an arylalkyl radical.

7. The process of claim 1, wherein the primary alcohol is selected from the group consisting of n-propanol, n-butanol, 3-methyl-1-butanol, 1-dodecanol, 1-hexa-decanol, 2 propene-1-ol, 2-phenyl-1-ethanol and benzyl alcohol.

8. The process of claim 1, wherein the resulting catalyst is contacted with the primary alcohol at a temperature of between −10° C. and 180° C.

9. The process of claim 1, wherein prior to the introduction of the primary alcohol the catalyst is subjected to a thermal treatment at a temperature between 150° and 300° C.